(12) United States Patent
Ishida

(10) Patent No.: US 10,773,177 B2
(45) Date of Patent: Sep. 15, 2020

(54) TRANSFORMABLE ROBOT

(71) Applicant: Brave Robotics Inc., Tokyo (JP)

(72) Inventor: Kenji Ishida, Tokyo (JP)

(73) Assignee: Brave Robotics, Inc., Tokyo (JP)

( * ) Notice: Subject to any disclaimer, the term of this patent is extended or adjusted under 35 U.S.C. 154(b) by 0 days.

(21) Appl. No.: 16/302,936

(22) PCT Filed: May 18, 2017

(86) PCT No.: PCT/JP2017/018656
§ 371 (c)(1),
(2) Date: Nov. 19, 2018

(87) PCT Pub. No.: WO2017/200038
PCT Pub. Date: Nov. 23, 2017

(65) Prior Publication Data
US 2019/0118106 A1   Apr. 25, 2019

(30) Foreign Application Priority Data

May 19, 2016 (JP) .................................. 2016-100429

(51) Int. Cl.
*A63H 3/04* (2006.01)
*A63H 33/00* (2006.01)
(Continued)

(52) U.S. Cl.
CPC ............ *A63H 33/003* (2013.01); *A63H 3/04* (2013.01); *A63H 3/20* (2013.01); *A63H 17/26* (2013.01); *B62D 61/12* (2013.01); *B62D 63/04* (2013.01)

(58) Field of Classification Search
USPC ....................................................... 446/268
See application file for complete search history.

(56) References Cited

U.S. PATENT DOCUMENTS

| 4,571,203 A * | 2/1986 | Murakami | ........... A63H 33/003 446/376 |
| 4,578,046 A * | 3/1986 | Ohno | ................... A63H 33/003 446/376 |

(Continued)

FOREIGN PATENT DOCUMENTS

| JP | 2004-351544 A | 12/2004 |
| JP | 2005-334053 A | 12/2005 |

(Continued)

OTHER PUBLICATIONS

[2015 International Tokyo Toy Show] 1/4 Scale to 26.5 Centi no Bumblebee go sorezore Kanzen Henkei! 'Trans former Kanzen Jido Henkel Robot' Happyokai Report, Gadget Tsus hin, Jun. 19, 2015 (Jun. 19, 2015), pp. 1/9 to 9/ 9, <URL:http:// getnews .jp/archives/1009561>.

(Continued)

Primary Examiner — John E Simms, Jr.
Assistant Examiner — Dolores R Collins
(74) Attorney, Agent, or Firm — Bay State IP, LLC

(57) ABSTRACT

A transformable robot that can take a vehicle form and a humanoid form. In the vehicle form, the robot has a front side section located on the side of a front center section, a cockpit in which a seat is arranged, a door section located on the side of the cockpit, and a rear upper section and rear lower section located behind the cockpit respectively upward and downward.
In the humanoid form, the front center section constitutes a head, the front side section constitutes a chest, the door section constitutes an arm, the rear upper section constitutes a lower back, and the rear lower section constitutes right and left legs and feet. The seat surface of the seat of the cockpit are kept at a same slope angle in both the vehicle form and the humanoid form.

2 Claims, 8 Drawing Sheets

(51) Int. Cl.
*B62D 61/12* (2006.01)
*B62D 63/04* (2006.01)
*A63H 3/20* (2006.01)
*A63H 17/26* (2006.01)

(56) References Cited

U.S. PATENT DOCUMENTS

| | | | | |
|---|---|---|---|---|
| 4,580,993 | A * | 4/1986 | Ohno | A63H 33/003 446/376 |
| 4,586,911 | A * | 5/1986 | Murakami | A63H 33/003 446/376 |
| 4,599,078 | A * | 7/1986 | Obara | A63H 33/003 446/376 |
| 5,626,506 | A * | 5/1997 | Halford | A63H 33/003 446/465 |
| 6,086,446 | A * | 7/2000 | Arriola | A63H 33/003 446/308 |
| 7,306,504 | B2* | 12/2007 | Saucier | A63H 3/003 446/268 |
| 7,785,168 | B2* | 8/2010 | Yamada | A63H 33/003 446/376 |
| D631,923 | S * | 2/2011 | Stoddard | D21/579 |
| 8,066,542 | B2* | 11/2011 | Ejima | A63H 33/003 446/376 |
| 8,128,450 | B2* | 3/2012 | Innai; Jun | A63H 33/003 446/14 |
| 8,137,151 | B2* | 3/2012 | Kenney | A63F 3/00028 446/330 |
| 8,187,049 | B2* | 5/2012 | Corsiglia | A63H 33/003 446/37 |
| 8,708,769 | B2* | 4/2014 | De La Torre | A63H 3/20 446/308 |
| 8,784,153 | B2* | 7/2014 | Sugimoto | A63H 33/003 273/142 R |
| 9,415,322 | B2* | 8/2016 | Kanauchi | A63H 33/003 |
| 9,457,283 | B2* | 10/2016 | Martinez | A63H 3/52 |
| 10,207,194 | B2* | 2/2019 | Sheltman | A63H 17/26 |
| 10,335,960 | B2* | 7/2019 | Tessier | B25B 27/04 |
| 2006/0270314 | A1* | 11/2006 | Campbell | A63H 17/00 446/431 |
| 2007/0262627 | A1* | 11/2007 | Clapper | A47D 9/02 297/260.2 |
| 2009/0082114 | A1* | 3/2009 | Stratford | A63F 3/0023 463/46 |
| 2009/0233519 | A1 | 9/2009 | Ejima | |
| 2015/0196850 | A1* | 7/2015 | Kobayashi | A63H 33/003 446/376 |
| 2019/0291016 | A1* | 9/2019 | Choi | A63H 33/003 |

FOREIGN PATENT DOCUMENTS

| | | |
|---|---|---|
| JP | 2007-118144 A | 5/2007 |
| JP | 2009-189521 A | 8/2009 |
| JP | 2009-219714 A | 10/2009 |
| JP | 2013-244198 A | 12/2013 |
| JP | 2015-130936 A | 7/2015 |

OTHER PUBLICATIONS

Extended European Search Report, European Patent Office, dated Oct. 29, 2019.
Project J-deite, J-deite Quarter Progress report Oct. 2014, Oct. 9, 2014, https://www.youtube.com/watch?v=Pjr9Ert7K-Y&feature=youtu.be (Including the still images 1-11, which are parts of the video).
Hiromu Tsuda, Interview with Developer of J-diete, Oct. 17, 2014, https://japanese.engadget.com/2014/10/16/j-deite-no-transform-no-robot/.
Hiroshi Watanabe, Witness Transformation of Real Giant Transformable Robot "J-deite", Oct. 17, 2014, https://monoist.atmarkit.co.jp/mn/articles/1410/17/news021.html.
Kazumichi Moriyama, "Digital Contents EXPO 2014" Report, Oct. 27, 2014, https://pc.watch.impress.co.jp/docs/column/kyokai/673245.html.
Kazumichi Moriyama, Minoru Otsuka, Feature Article2 "Robot can move at well", Robocon Magazine, Ohmsha, Jan. 1, 2015 No. 97, p. 22-23.
Nihon Keizai Shinbun, Tokyo Toy Show Open: Tomy Company Ltd., Exhibit Prototype of Automatic Transformable Robot, Jun. 18, 2015, https://www.nikkei.com/article/DGXLASDZ18I4Z_Y5A610C1000000/.
Mantan, Transformer: Latest Automatic Transformable Model Debut. Commercialize within 2 Years, Jun. 18, 2015, https://mantan-web.jp/article/20150618dog00m200050000c.html.
Impress Corporation, [Newsflash] Dream of Fully Transformable Robot Transformer Comes soon!, Jun. 18, 2015, https://pc.watch.impress.co.jp/docs/news/707660.html.
Impress Corporation, Detailed Report: Presentation of "Transformer-Completely Transformable Robot" by Tomy Company Ltd., Jun. 19, 2015, https://pc.watch.impress.co.jp/docs/news/707862.html.
Minoru Otsuka, Tomy Company, Ltd. Plans to Sell Fully Transformable Robot Equipped with "V-Side OS" (1/2), Jun. 19, 2015, https//monoist.atmarkit.co.jp/mn/articles/1506/19/news095.html.
IID., Inc. [Tokyo Toy Show 2015] Transformer—Realized Automatic Transformation, Jun. 19, 2015, https://www.rbbtoday.com/article/2015/06/19/132449.html.
Notice of Reasons for Rejection, dated Jun. 2, 2020, Japanese Patent Office.

* cited by examiner

TRANSFORMABLE ROBOT

CROSS REFERENCE TO RELATED APPLICATION

This application is for entry into the U.S. National Phase under § 371 for International Application No. PCT/JP2017/018656 having an international filing date of May 18, 2017, and from which priority is claimed under all applicable sections of Title 35 of the United States Code including, but not limited to, Sections 120, 363, and 365(c), and which in turn claims priority under 35 USC 119 to Japanese Patent Application No. 2016-100429 filed on May 19, 2016.

TECHNICAL FIELD

The present invention relates to a transformable robot that can transform mutually between a humanoid form and a vehicle form.

BACKGROUND ART

Conventionally, in fields such as toys, there are transformable robots that can transform from a vehicle form to a humanoid form or other forms freely (refer to Patent Documents 1 to 4 for examples). These robots, having a plurality of components constituting a vehicle form separably, transform the vehicle form into a humanoid form by reconstituting arrangement and posture of each of the separated components.

In Patent Documents 1 to 4, when transforming from the vehicle form to the humanoid form, a cockpit is configured to change in posture from being longer in the longitudinal direction in the vehicle form to being longer in the vertical direction in the humanoid form. This results from the fact that while a vehicle is normally configured to have a cockpit that is longer in the longitudinal direction, a human has a breastplate that is longer in the vertical direction.

However, if greatly transforming the posture of the cockpit in transformation, the posture of the cockpit of the transformable robot becomes largely different not only in the case of the transformable robot as a toy, but also when a human being actually gets in the cockpit. In this connection, there arises a problem of difficulty in maintaining the posture of an operator getting in the cockpit before, after and in the middle of transformation.

RELATED ART DOCUMENTS

Patent Documents

[Patent Document 1] Japanese Unexamined Patent Application Publication No. 2009-189521
[Patent Document 2] Japanese Unexamined Patent Application Publication No. 2009-219714
[Patent Document 3] Japanese Unexamined Patent Application Publication No. 2013-244198
[Patent Document 4] Japanese Unexamined Patent Application Publication No. 2015-130936

DISCLOSURE OF THE INVENTION

Problems to be Solved by the Invention

The present invention was accomplished in view of above-mentioned point, and the purpose is to provide the transformable robot enabling posture transformation between the vehicle form and the humanoid form without changing the posture of the cockpit.

Means of Solving the Problems

To solve the above-mentioned problem, a transformable robot (1) according to the present invention is transformable robot (1) that can take a vehicle form (1C) and a humanoid form (1H). In the vehicle form (1C), the transformable robot (1) has a front center section (11) located at the front center, a front right side section (12R) and a front left side section (12L) located on the sides of the front center section (11), a cockpit (21), in which a seat (21S) is arranged, located behind the front center section (11), a right door section (22R) and a left door section (22L) located on the sides of the cockpit (21), a rear upper section (31) located upward behind the cockpit (21), and a rear right lower section (32R) and a rear left lower section (32L) located under the rear upper section (31). In the humanoid form (1H), the front center section (11) constitutes a head. The front right side section (12R) and the front left side section (12L) constitute a chest. The right door section (22R) and the left door section (22L) constitute right and left arms respectively. The rear upper section (31) constitutes a lower back. The rear right lower section (32R) and the rear left lower section (32L) constitute right and left legs and feet respectively. A seat surface (21Sa) of the seat (21S) in the cockpit (21) is at a same slope angle both in the vehicle form (1C) and the humanoid form (1H).

In this way, if the seat surface (21Sa) of the seat (21S) is configured at the same slope angle both in the vehicle form (1C) and the humanoid form (1H), the transformable robot (1) that enables the posture transformation between the vehicle form (1C) and the humanoid form (1H) without changing the posture of the front center section (11) serving as the cockpit can be provided.

In addition, in the transformable robot (1) of the above-described configuration, the cockpit (21) and the rear upper section (31) are connected to each other by a front link (51) and a rear link (52) disposed in the longitudinal direction. A distance from a cockpit side connection point (51a) to a rear upper section side connection point (51b) of the front link (51) is configured to be the same as a distance from a cockpit side connection point (52a) to a rear upper section side connection point (52b) of the rear link (52). A line connecting between the cockpit side connection point (51a) and the rear upper section side connection point (51b) of the front link (51) may be disposed in parallel to a line connecting between a cockpit side connection point (52a) and a rear upper section side connection point (52b) of the rear link (52).

In this way, if the line connecting between the connection points (51a, 51b) of the front link (51) and the line connecting between the connection points (52a, 52b) of the rear link (52) are disposed in parallel to each other, and the distance between the cockpit side connection point (51a) and the rear upper section side connection point (51b) of the front link (51) is configured to be the same as the distance between the cockpit side connection point (52a) and the rear upper section side connection point (52b) of the rear link (52), the four connection points of the cockpit side connection point (51a), the rear upper side connection point (51b), the cockpit side connection point (52a) and the rear upper side connection point (52b) constitute a parallelogram. In any of the vehicle form (1C) and the humanoid form (1H), and in any intermediate form during transformation, the posture of the seat surface (21Sa) of the seat (21S) at the front center section (11) can be kept at the same slope angle.

Moreover, in the transformable robot (1) of the above-described configuration, the rear upper section (31), the rear right lower section (32R) and the rear left lower section (32L) may be at a same slope angle both in the vehicle form (1C) and the humanoid form (1H).

In this way, if the rear upper section (31), the rear right lower section (32R) and the rear left lower section (32L) are horizontal both in the vehicle form (1C) and the humanoid form (1H), the posture of the seat surface (21Sa) of the seat (21S) can kept horizontal before and after transformation.

In addition, in the transformable robot (1) of the above-described configuration, the rear upper section (31), the rear right lower section (32R) and the rear left lower section (32L) are connected to each other by an upper link group (61) and a lower link group (62) disposed symmetrically or approximately symmetrically to each other in the vertical direction. At the time of transformation between the vehicle form (1C) and the humanoid form (1H), the upper link group (61) and the lower link group (62) may be driven symmetrically.

In this way, if the upper link group (61) and the lower link group (62) are driven symmetrically at the time of transformation between the vehicle form (1C) and the humanoid form (1H), the rear upper section (31) moves in the vertical direction with respect to the rear right lower section (32R) and the rear left lower section (32L) in contact with the land surface. Therefore, also in any intermediate form during transformation, the posture of the rear upper section (31) can be kept in parallel to the rear left lower section (32R) and the rear left lower section (32L). And consequently, the posture of the seat surface (21Sa) of the seat (21S) in the cockpit (21) disposed at a slope angle with respect to the rear upper section (31) can be kept at the same slope angle before and after transformation.

Furthermore, in the transformable robot (1) of the above-described configuration, in transformation from the vehicle form (1C) to the humanoid form (1H), the front center section (11) may be configured to move above a front window section (21F) disposed at the front of the cockpit (21). And, the front right side section (12R) and the front left side section (12L) may be configured to move in a direction approaching to each other.

In this way, after moving the front center section (11), serving as the head of the humanoid form (1H), above the front window section (21F), the front right side section (12R) and the front left side section (12L) are moved only in the horizontal direction when constituting the chest of the humanoid form (1H). Thus, the posture of the seat surface (21Sa) of the seat (21S) is unaffected when constituting the head and the chest of the humanoid form (1H), the transformation is completed while keeping the seat surface (21Sa) at the same slope angle. It should be noted that the bracketed reference numerals are examples of the elements of the embodiment described later.

Effects of the Invention

According to the transformable robot in accordance with the present invention, the transformation in posture between the vehicle form and the humanoid form can be performed without changing the posture of the cockpit.

BRIEF DESCRIPTION OF THE DRAWINGS

FIGS. 4A to 4C are explanatory views of transformation, illustrating a positional relationship of a front section, a center section and a rear section, of which FIG. 4A shows a vehicle form, FIG. 4B shows an intermediate form, and FIG. 4C shows a state in which the cockpit is mounted;

FIGS. 6A to 6C are explanatory views of transformation, illustrating a positional relationship of a rear upper section and a rear lower section, of which FIG. 6A shows a vehicle form, FIG. 6B shows an intermediate form and FIG. 6C shows a humanoid form;

FIGS. 8A and 8B are explanatory perspective views illustrating transformation when moving a head and a chest of a humanoid form, of which FIG. 8A shows transformation when forming a head and FIG. 8B shows transformation when forming a chest.

MODE FOR CARRYING OUT THE INVENTION

Figure 1:
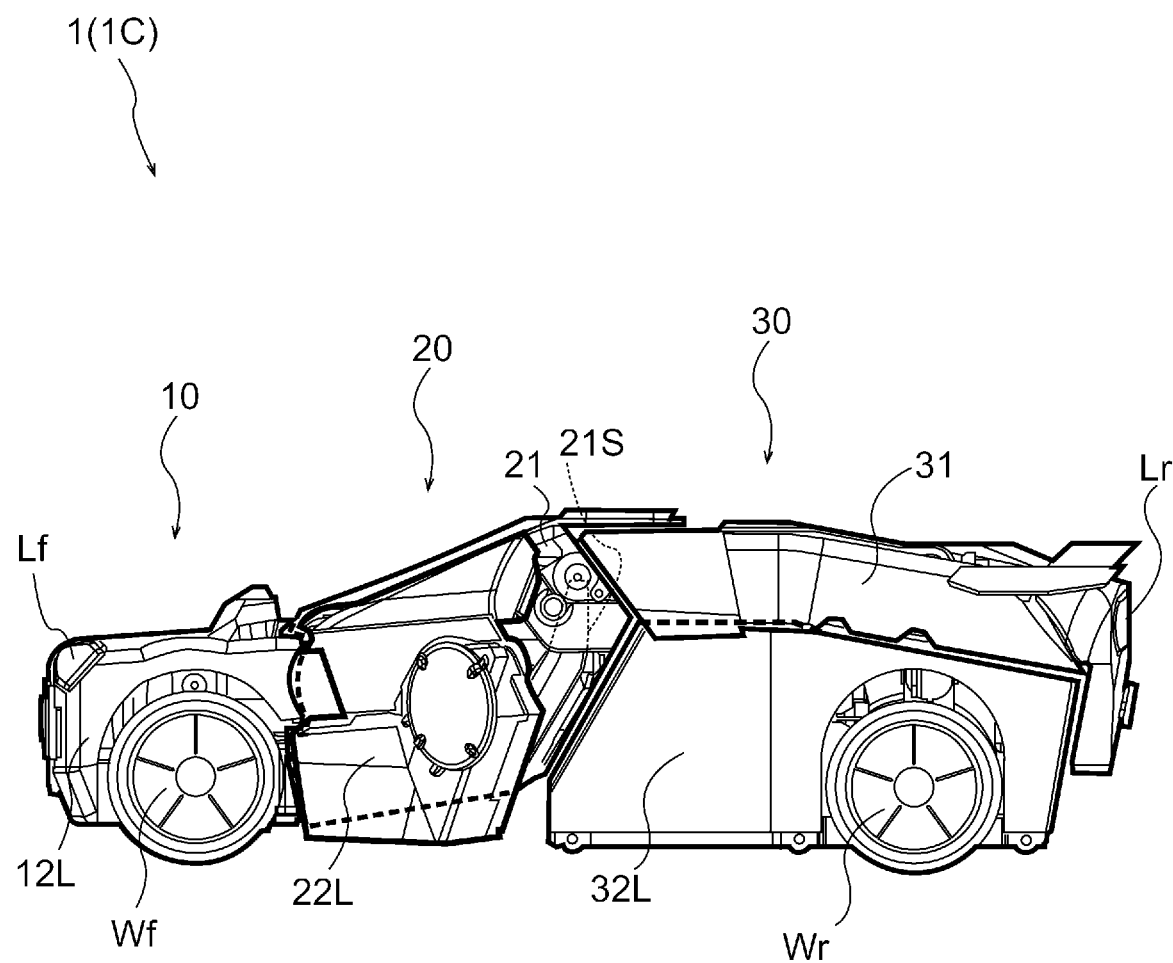
FIG. 1 is a side-view illustrating a vehicle form of a transformable robot.

Hereinafter, an embodiment of the present invention will be described in detail with reference to the accompanying drawings. First, an appearance of a transformable robot 1 before and after transformation and names of components will be described with reference to FIGS. 1 to 3. FIG. 1 is a side-view illustrating a vehicle form 1C of the transformable robot 1, of which a door section 22 is open.

As shown in FIG. 1, the transformable robot 1 in the vehicle form 1C is divided into a front section 10 located at the front, including a front light Lf and a front wheel Wf, a center section 20 located at the center in the longitudinal direction, including the door section 22 and a seat 21S, and a rear section 30 located at the rear, including a rear light Lr and a rear wheel Wr.

Figure 2:
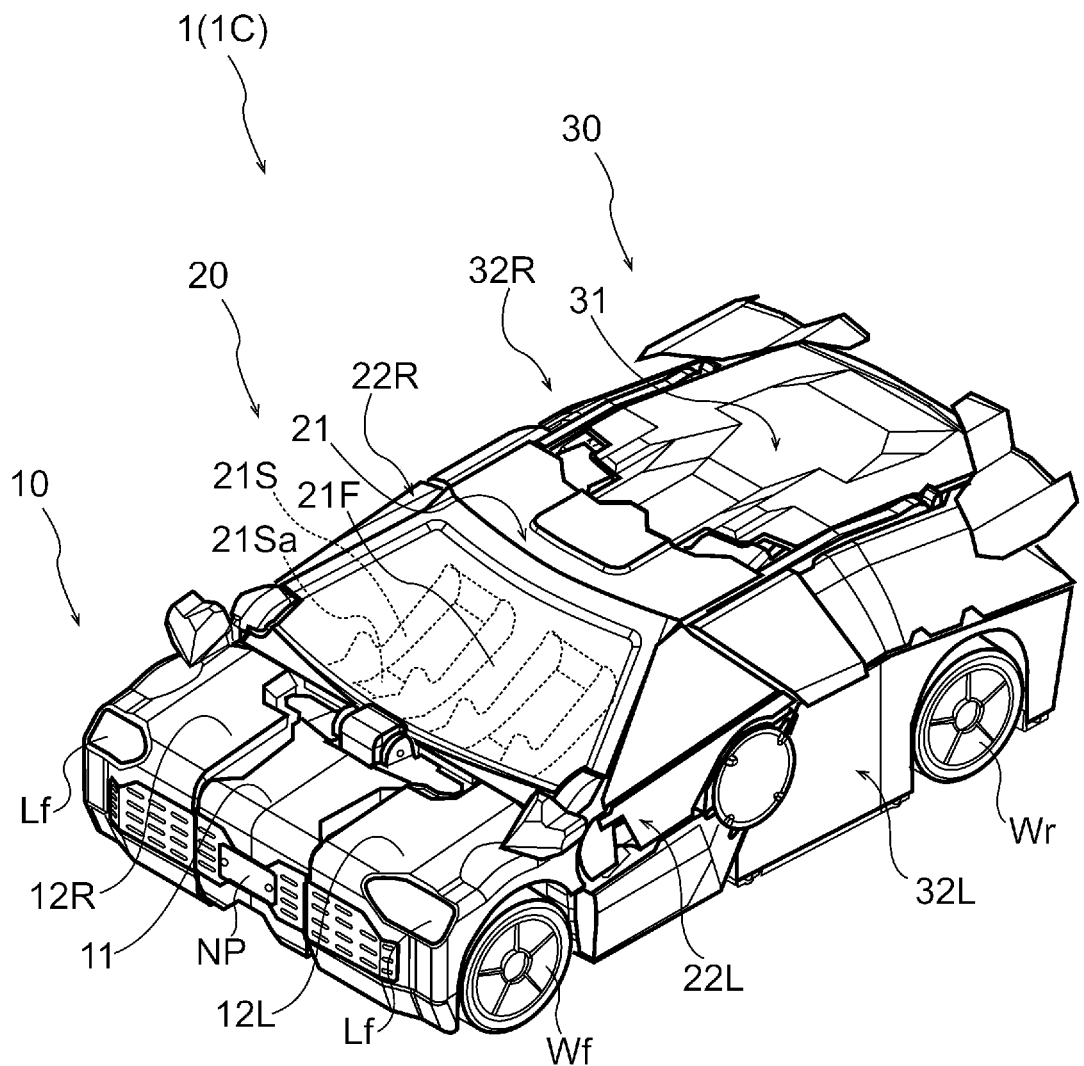
FIG. 2 is a perspective view illustrating a vehicle form of a transformable robot.

FIG. 2 is a perspective view illustrating the vehicle form 1C of the transformable robot 1. As shown FIG. 2, in the vehicle form 1C, the front section 10 has a front center section 11 and a front side section 12 arranged on a side of the front center section 11. The front center section 11 is located at the front center, and a number plate NP of the vehicle is arranged on the front center section 11. The front side section 12 is composed of a front right side section 12R and a front left side section 12L and has the front light Lf.

The center section 20 has a cockpit 21 arranged at the center in the width direction and the door section 22 for getting in and out of the cockpit 21. A transparent or semitransparent front window section 21F is formed on the front of the cockpit 21, allowing an operator seated on the seat 21S to view forward from the seat 21S. A seat surface 21Sa is formed on the seat 21S. The operator can get in the cockpit 21 by opening the door section 22 located on the right and left sides. The door section 22 is composed of a right door section 22R and a left door section 22L that can be opened in the outside direction using a motor that is not illustrated in the figure.

The rear section 30 has a rear upper section 31 located upward behind the cockpit 21 and a rear lower section 32 located under the rear upper section 31. The lower rear section 32 is composed of a rear right lower section 32R and a rear left lower section 32L, at each of which a rear wheel Wr is arranged.

Figure 3:
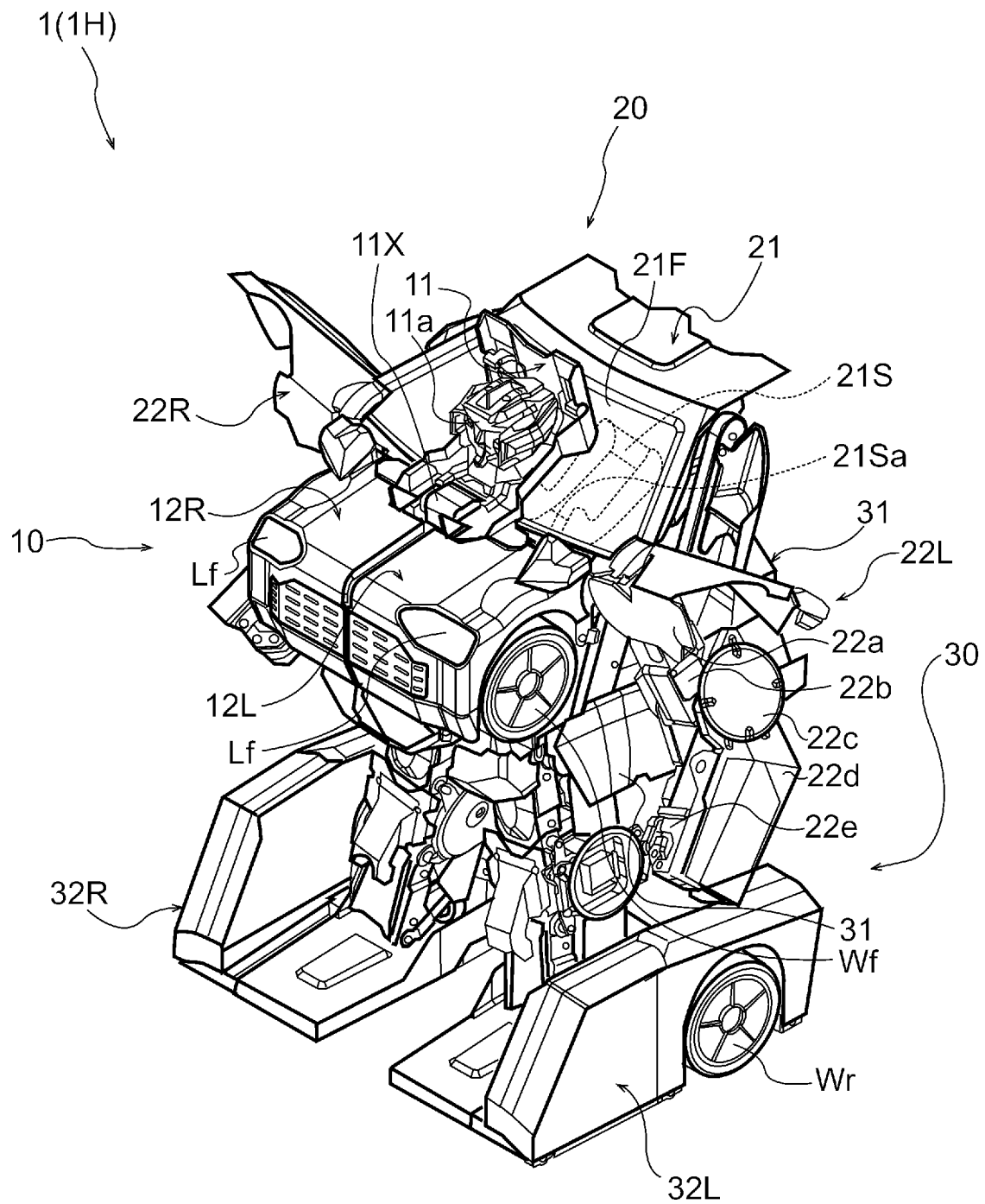
FIG. 3 is a perspective view illustrating a humanoid form of a transformable robot.

FIG. 3 is a perspective view illustrating the humanoid form 1H of the transformable robot 1. As shown in FIG. 3, when the transformable robot 1 is in the humanoid form 1H, the front center section 11 in the vehicle form 1C rises up around a turning shaft 11X and moves above the front window section 21F arranged on the front of the cockpit 21. In this way, the front center section 11 becomes the head of the humanoid form 1H having a face 11a. Moreover, in the humanoid form 1H, the front right side section 12R and the front left side section 12L move in front of the face 11a to form the chest.

It should be noted that, as described above, each of the front right side section 12R and the front left side section 12L constituting the chest in the humanoid form 1H have the front wheel Wf. Here, the front wheel Wf is configured to be rotatably driven also in the humanoid form 1H to function as so-called a reaction wheel for posture control.

The right door section 22R and the left door section 22L in the vehicle form 1C constitute right and left arms respectively in the humanoid form 1H. As described above, the right and left door sections 22 move so as to open with respect to the cockpit 21 by a motor (not illustrated in the figure) provided between the cockpit 21 and these doors. Furthermore, in the humanoid form 1H, the door section 22 is separated into a plurality of members that freely move by links and motors at junctions between the members that are not illustrated. In this embodiment, the door section 22 in the vehicle form 1C is separated into a shoulder section 22a, an upper arm 22b, an elbow 22c, a forearm 22d and a finger 22e in the humanoid form 1H.

Also, the upper rear section 31 in the vehicle form 1C constitutes a lower back in the humanoid form 1H. The rear right lower section 32R and the rear left lower section 32L in the vehicle form 1C constitute respectively right and left legs and feet in the humanoid form 1H.

Figure 4A:
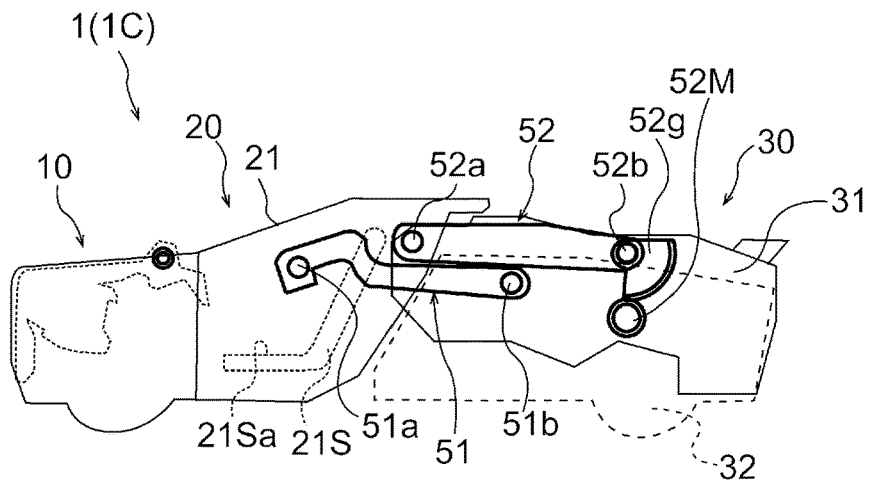
Figure 4B:
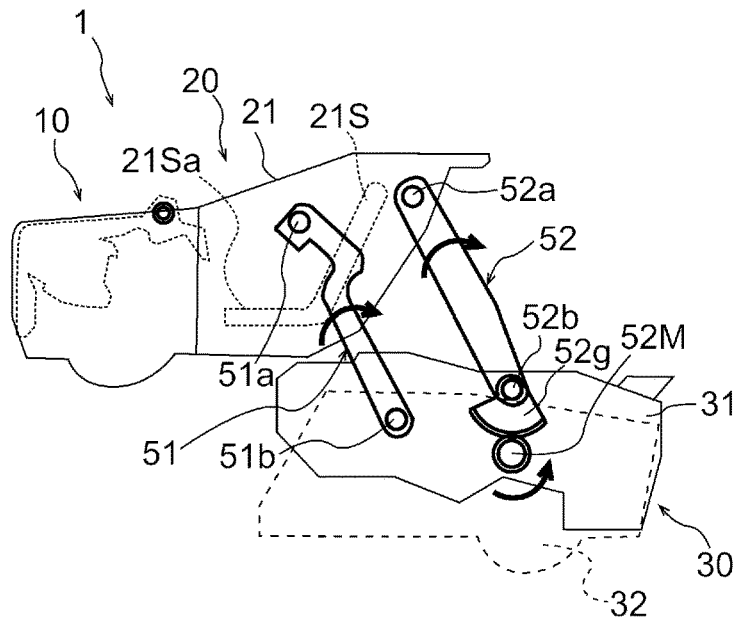
Figure 4C:
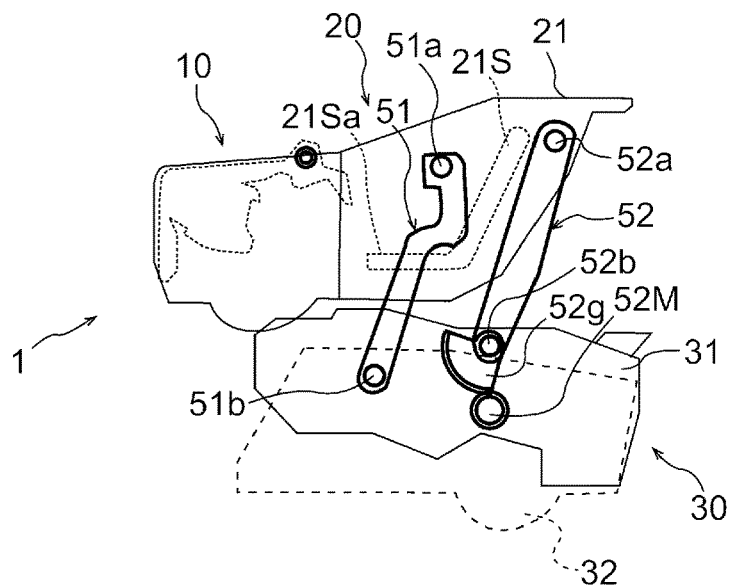

Next, how each of the components moves at the time of transformation from the vehicle form 1C to the humanoid form 1H will be described with reference to FIGS. 4 to 8. First, the front section 10 and the center section 20 rise up from the rear section 30. FIGS. 4A to 4C are explanatory views of transformation, illustrating positional relationships of the front section 10 and the center section 20 with the rear section 30. FIG. 4A shows the vehicle form 1C. FIG. 4B shows an intermediate form. FIG. 4C shows a state in which the cockpit is mounted.

As shown in FIG. 4, the cockpit 21 and the rear upper section 31 are connected to each other by two links disposed in the longitudinal direction. In FIG. 4, only one pair of a front link 51 and a rear link 52 is illustrated for explanation of the movement of the links. In the transformable robot 1 of this embodiment, two pairs of the front link 51 and the rear link 52 are disposed in the width direction. Installation intensity of the cockpit 21 to the rear upper section 31 can be enhanced by attaching the plurality of the pairs of the links in the longitudinal direction.

The front link 51 has a cockpit side connection point 51a that serves as a connection point to the cockpit 21 and a rear upper side connection point 51b that serves a connection point to the upper rear section 31. In addition, the rear link has a cockpit side connection point 52a that serves a connection point to the cockpit 21 and a rear upper side connection point 52b that serves as a connection point to the upper rear section 31.

Here, a distance between the cockpit side connection point 51a and the rear upper side connection point 51b of the front link 51 is configured to be the same as a distance between the cockpit side connection point 52a and the rear upper side connection point 52b of the rear link 52. In addition, the front link 51 and the rear link 52 are disposed so that the line connecting between the cockpit side connection point 51a and the rear upper side connection point 51b of the front link 51 and the line between the cockpit side connection point 52a and the rear upper side connection point 52b of the rear link 52 are in parallel to each other.

Moreover, a fan-shaped gear 52g, along with the rear upper side connection point 52b, serving as a turning shaft is disposed integrally with the rear link 52. Furthermore, a rear link driving motor 52M for driving the fan-shaped gear 52g is disposed to the upper rear 31.

Movements at the time of transformation in this configuration will be described. First, as shown in FIG. 4A, the front link 51 and the rear link 52 in the vehicle form 1C are extended in the longitudinal direction of the vehicle. In this state, the front section 10, the center section 20 and the rear section 30 are in line in this order from forward to backward.

As shown in FIG. 4B, when the rear link driving motor 52M rotates a motor shaft counterclockwise in the figure, the fan-shaped gear 52g engaged with the motor shaft turns clockwise. Then, the rear link 52 integrated with the fan-shaped gear 52g turns clockwise. And, the cockpit 21 and the front section 10 in front of the cockpit 21 are lifted upward by the movement of the cockpit side connection point 52a. By the movement of the cockpit 21 upward, the front link 51 connected to the cockpit 21 also turns clockwise in the figure. Thus, the front section 10 and the center section 20 including the cockpit 21 are lifted upward above the rear section 30.

As shown in FIG. 4C, when the front section 10 and the center section 20 move to a position above the rear section 30, the rear link driving motor 52M stops driving the fan-shaped gear 52g. In this way, the front section 10 and the center section 20 are held above the rear section 30 by the front link 51 and the rear link 52, and thus the cockpit 21 is mounted above the rear section 30.

Consequently, the seat surface 21Sa of the seat 21S in the cockpit 21 keeps the same slope angle from the vehicle form 1C to the state in which the cockpit 21 is mounted above the rear section 30 and in the intermediate state. This is because during the transformation, the line connecting between the cockpit side connection point 51a of the front link 51 and the cockpit side connection point 52a of the rear link 52 moves in parallel to the line connecting between the rear upper side connection point 51b of the front link 51 and the rear upper side connection point 52b of the rear link 52, whereby in any form, the seat surface 21Sa in the vehicle form 1C can be kept at the same slope angle.

Figure 5:
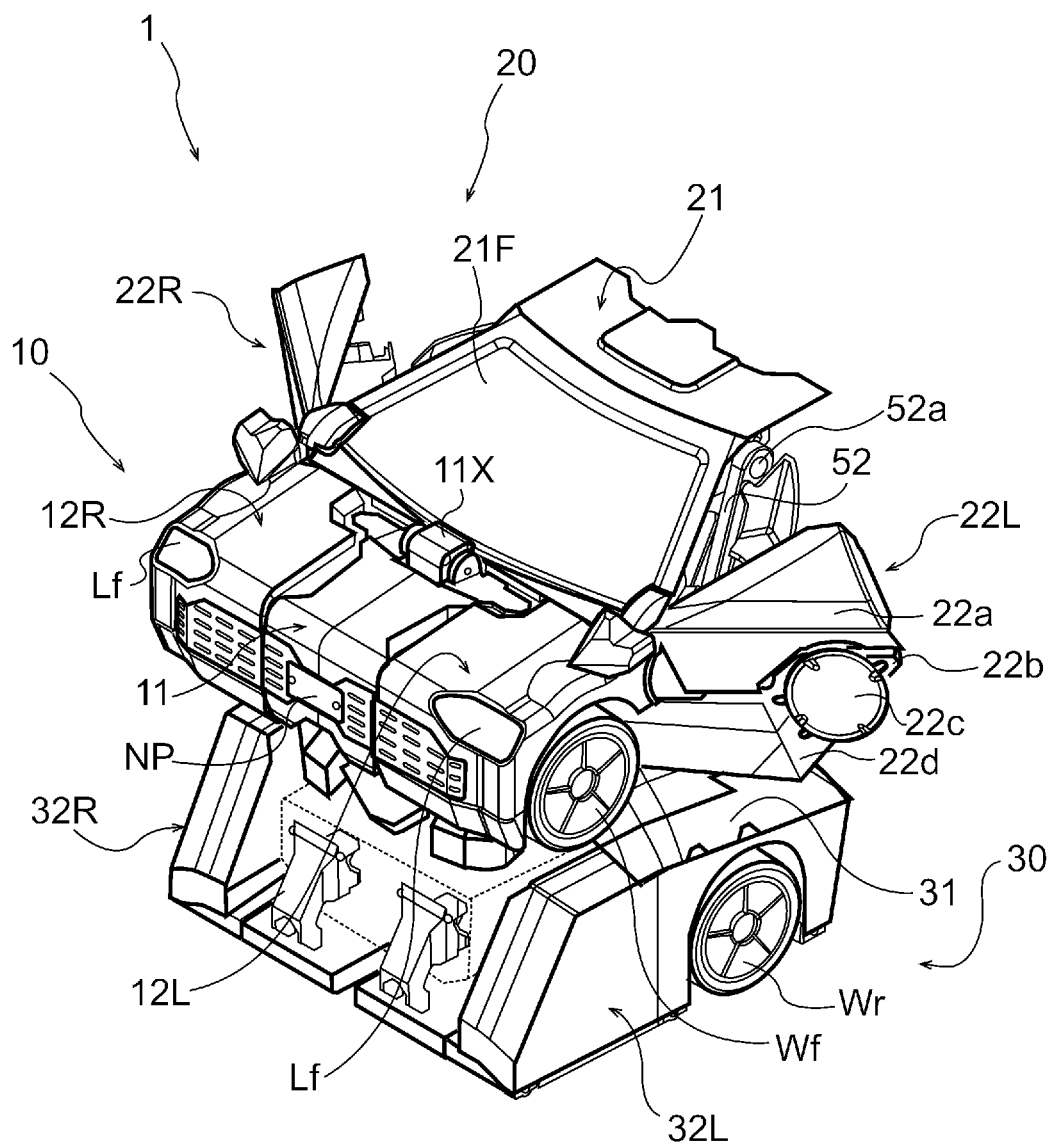
FIG. 5 is an explanatory view of transformation, illustrating a perspective view of a state, in which the cockpit is mounted.

FIG. 5 is an explanatory view of transformation, illustrating a perspective view of the state in which the cockpit 21 is mounted. FIG. 5 is a perspective view of the state shown in FIG. 4C. As shown in FIG. 5, in the state in which the cockpit 21 is mounted above the rear section 30, the front section 10 is in the same state as in the vehicle form 1C. Namely, the front right side section 12R and the front left side section 12L are adjacent respectively to right and left of the front center section 11. The rear section 30 is also in the same state as in the vehicle form 1C. Namely, the upper rear section 31 is mounted on the rear lower section 32 in contact therewith.

On the other hand, the positional relationship of the cockpit 21 of the center section 20 with the front section 10 is the same as in the vehicle form 1C, but the right door section 22R and the left door section 22L arranged respectively to right and left of the cockpit 21 are separated from the cockpit 21.

Figure 6A:
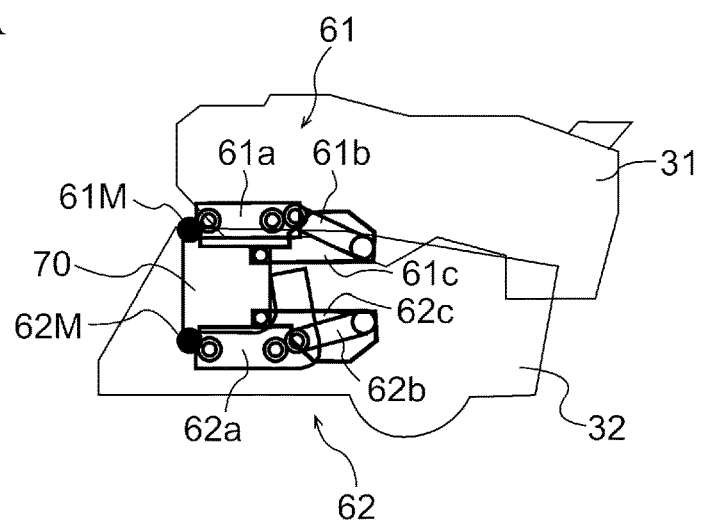
Figure 6B:
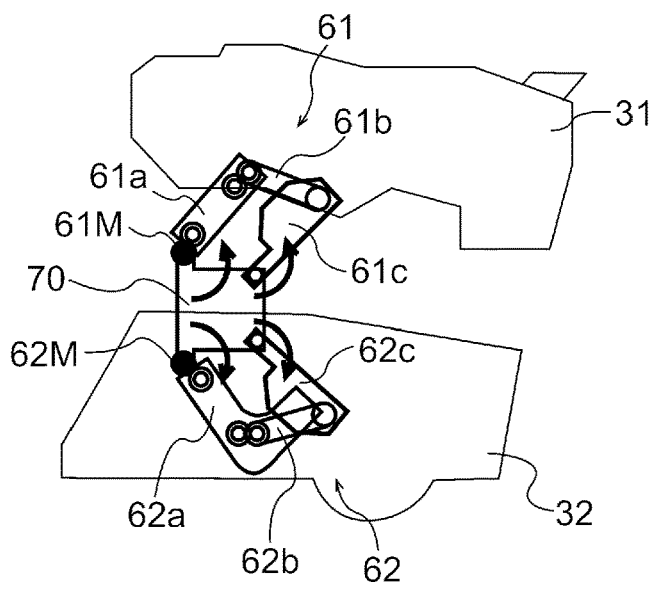
Figure 6C:
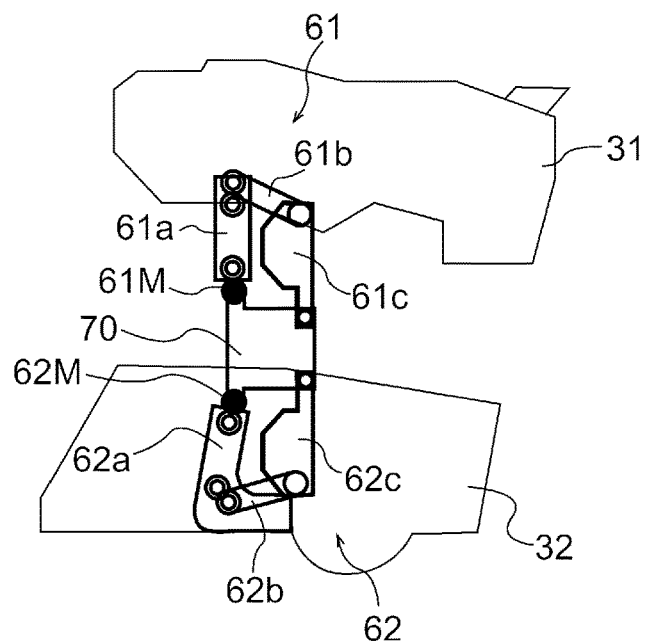

FIGS. 6A to 6C are explanatory views of transformation, illustrating the positional relationship of the rear upper section 31 and the rear lower section 32, of which FIG. 6A shows the state in which the cockpit 21 is mounted, FIG. 6B shows an intermediate form and FIG. 6C shows the humanoid form 1H. The front section 10 and the center section 20 are omitted in these figures for convenience of description. FIG. 6A shows approximately the same state as FIG. 4C and FIG. 5.

As is shown in FIG. 6, the upper rear section 31 is connected to the rear right lower section 32R and the rear left lower section 32L by two link groups disposed approximately symmetrically in the vertical direction. Specifically, an upper link group 61 is disposed above a base 70, and a lower link group 62 is disposed under the base 70. In addition, an upper link group driving motor 61M that drives the upper link group 61 is disposed at an upper end of the base 70. A lower link group driving motor 62M that drives the lower link group 62 is disposed at a lower end of the base 70.

In this embodiment, the upper link group 61 has an upper first link 61a driven directly by the upper link group driving motor 61M, an upper second link 61b, of which an end is connected to the upper first link 61a, and an upper third link 61c, of which an end is connected to the upper second link 61b. The other end of the upper third link 61c is connected to the base 70. Thus, the upper link group driving motor 61M, the upper first link 61a, the upper second link 61b, the upper third link 61c and the base 70 are connected to each other in series. In addition, the upper second link 61b is connected to the upper rear section 31.

In this embodiment, the lower link group 62 has a lower first link 62a driven directly by a lower link group driving motor 62M, a lower second link 62b, of which one end is connected to the lower first link 62a and a lower third link 62c, of which one end is connected to the lower second link 62b. The other end of the lower third link 62c is connected to the base 70. Thus, the lower link group driving motor 62M, the lower first link 62a, the lower second link 62b, the lower third link 62c and the base 70 are connected to each other in series. And, the lower second link 62b is connected to the rear lower section 32.

In this way, the upper link group 61 and the lower link group 62 are provided approximately symmetrically to each other and respectively upward and downward from the base 70. When performing transformation between the vehicle form 1C and the humanoid form 1H, the upper link group 61 and the lower link group 62 are driven symmetrically as follows.

As shown in FIG. 6A, in the state in which the rear upper section 31 is in contact with the rear lower section 32, the upper link group 61 and the lower link group 62 are horizontally folded respectively above and under the base 70. Thus, the rear upper section 31 and the rear lower section 32 can be in contact with each other.

As shown FIG. 6B, the upper link group driving motor 61M and the lower link group driving motor 62M disposed on the base 70 are driven simultaneously in the directions of the arrows in the figure. Accordingly, the upper link group 61 and the lower link group 62 extend respectively upward and downward from the base 70.

Consequently, the rear upper section 31 connected to the upper second link 61b rises upward relative to the base 70, and the rear lower section 32 connected to the lower second link 62b comes downward relative to the base 70. However, in reality, the base 70 is fixed at a position independent of both the rear upper section 31 and the rear lower section 32. Therefore, the base 70 rises up and the rear upper section 31 rises farther upward while the rear lower section 32 stays on the ground without moving.

As shown in FIG. 6C, when the upper first link 61a and the upper third link 61c of the upper link group 61 extend in the vertical direction, the rear upper section 31 reaches the highest position. At this time, the upper link group driving motor 61M stops. Since the lower link group 62 is driven symmetrically to the upper link group 61 in this case, the lower first link 62a and the lower third link 62c of the lower link group 62 extend in the vertical direction.

In this case, the rear upper section 31 and the rear lower section 32 are farthest from each other. And, the rear upper section 31 constituting the lower back moves to the highest position, and the rear right lower section 32R and the rear left lower section 32L constituting the legs and feet are separated farthest from each other. At this time, the upper part link group 61 constitutes a femoral section of the humanoid form 1H. The lower link group 62 and the base 70 constitute respectively a part of a lower thigh and a knee of the humanoid form 1H. Thus, these constitute the humanoid form 1H that stands upright.

Here, when the rear section 30 that was in the same state in the vehicle form 1C is transformed into the humanoid form 1H, the upper link group 61 connected to the rear upper section 31 and the lower link group 62 connected to the rear lower section 32 are driven symmetrically to each other respectively upward and downward. And, the distance between the upper first link 61a and the lower first link 62a is approximately the same as the distance between the upper third link 61c and the lower third link 62c. Thus, the rear upper section 31 rises up, keeping parallel to the rear right lower section 32R and the rear left lower section 32L.

In this embodiment, the lower first link 62a is in the form of an L-shape unlike the upper first link 61a. And, the upper link group 61 and the lower link group 62 are configured approximately symmetrically to each other respectively upward and downward. However, the configurations and the shapes are not limited to those described here. Namely, the lower first link may be configured in an I-shape like the upper first link 61a, and the upper link group 61 and the lower link group 62 may be configured symmetrically to each other respectively upward and downward.

Figure 7:
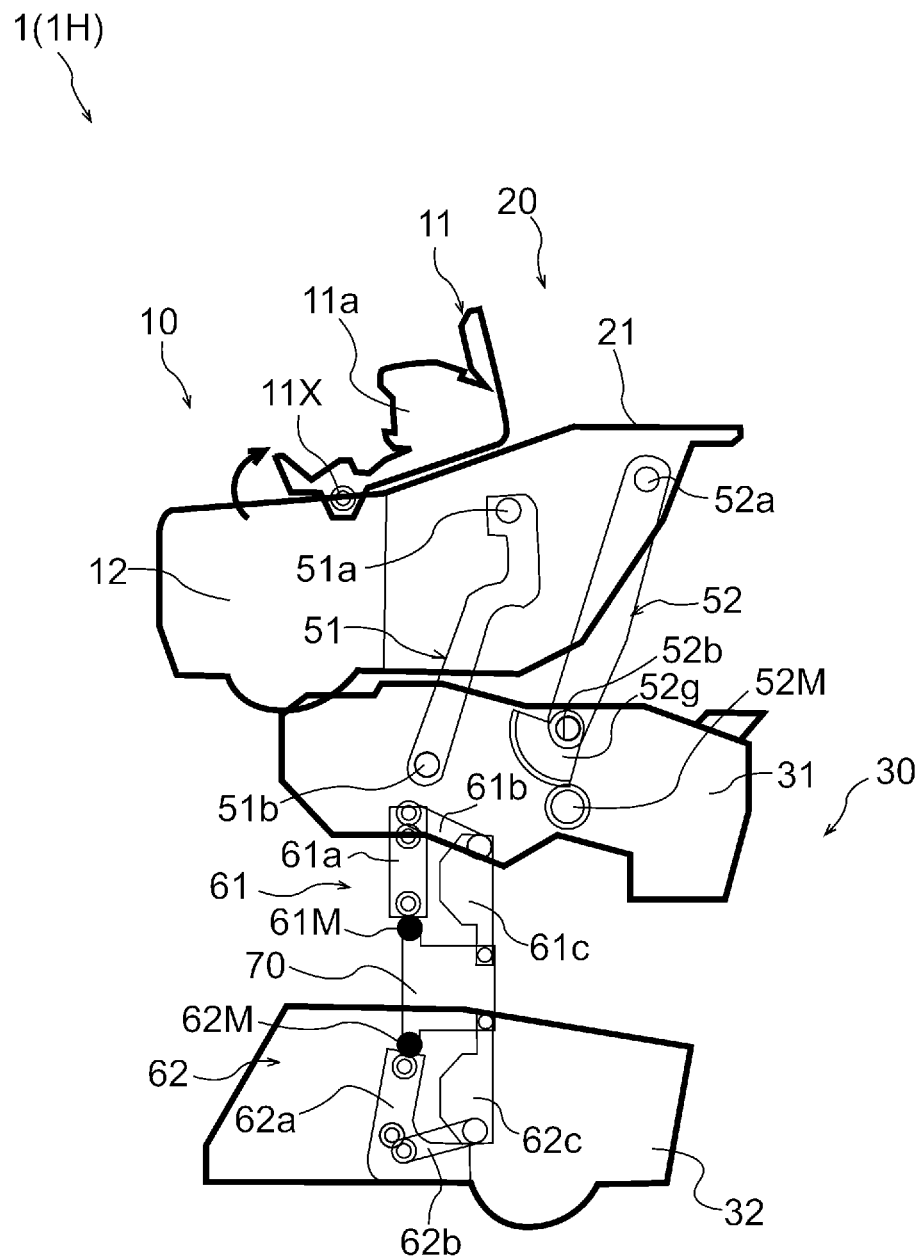
FIG. 7 is an explanatory side-view illustrating transformation when moving a head of a humanoid form.

FIG. 7 is an explanatory side-view illustrating transformation when moving the head of the humanoid form 1H. As shown in FIG. 7, the front center section 11 turns around the turning shaft 11X in the direction of the arrow in the figure and moves above the front window section 21F. At this time, the face 11a of the front center section 11 appears and constitutes the head.

Figure 8A:
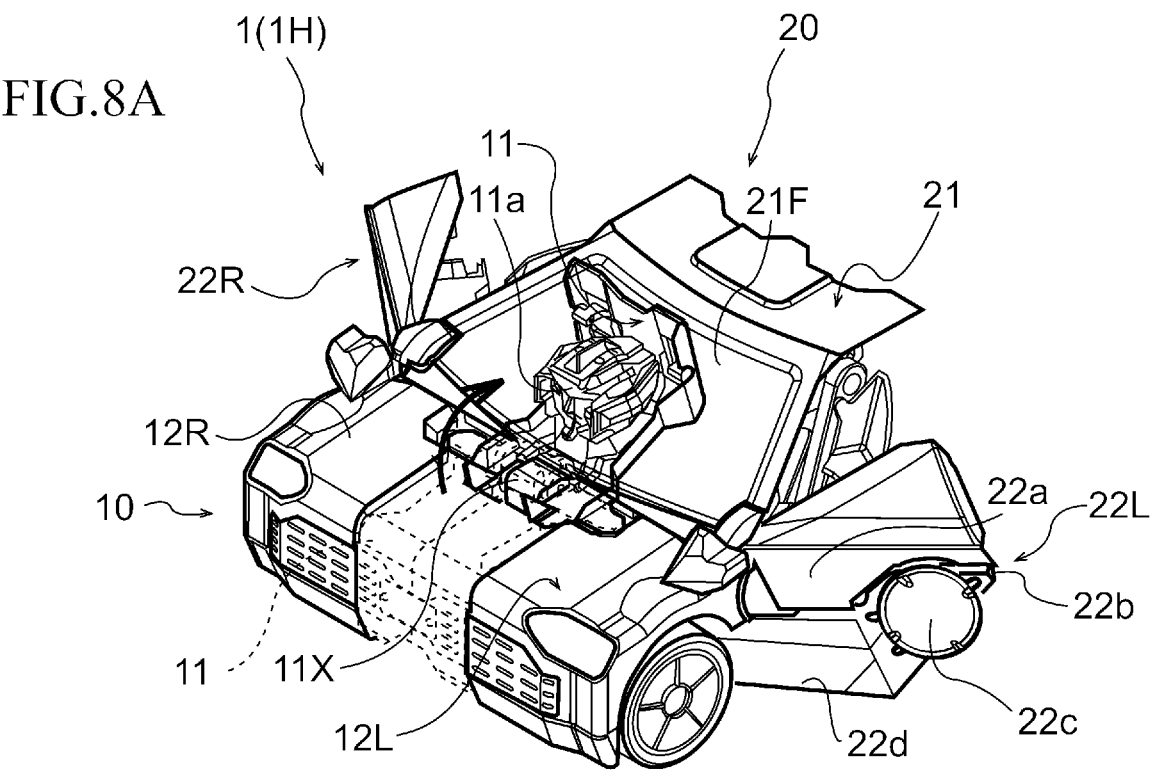
Figure 8B:
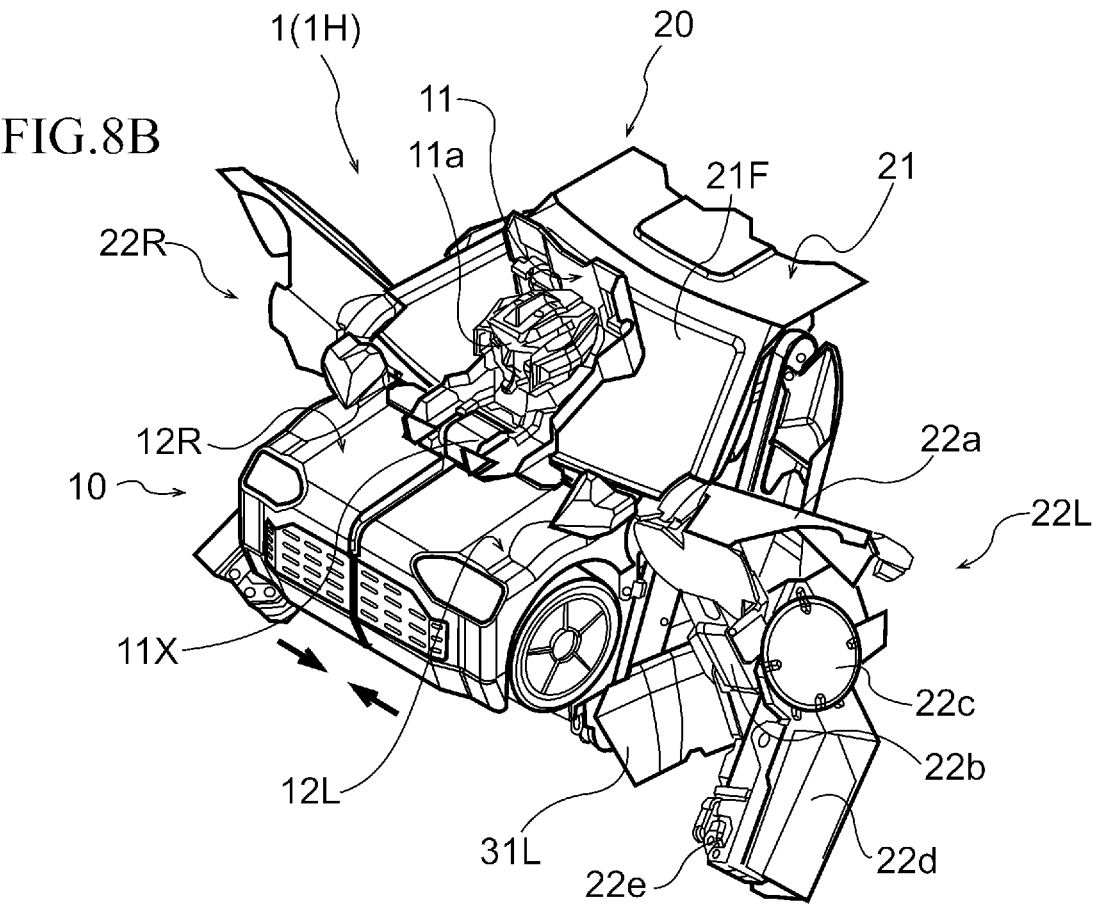

FIGS. 8A and 8B are explanatory perspective views illustrating transformation when moving the head and the chest of the humanoid form 1H, of which FIG. 8A shows transformation when forming the head and, FIG. 8B shows transformation when forming the chest. FIG. 8A shows the same state as FIG. 7.

As shown in FIG. 8A, the front center section 11 turns upward around the turning shaft 11X and moves above the front window section 21F, whereby the face 11a appears as described above. Then, a gap is generated at a place, between the front right side section 12R and the front left side section 12L, where the front center section 11 was before. Thereafter, as shown in FIG. 8B, the front right side section 12R and the front left side section 12L move in the mutually approaching direction by a motor that is not illustrated in the figure. In this way, the humanoid form 1H of the transformable robot 1 is completed.

As described above, in the transformable robot 1 of this embodiment, the seat surface 21Sa of the seat 21S is configured at the same slope angle both in the vehicle form 1C and the humanoid form 1H. This enables posture transformation without changing the posture of the front center section 11 serving as the cockpit between the vehicle form 1C and the humanoid form 1H.

Furthermore, the line connecting between the connection points 51a, 51b of the front link 51 are disposed in parallel to the line connecting between the connection points 52a, 52b of the rear link 52. The distance between the cockpit side connection point 51a and the rear upper section side connection point 51b of the front link 51 is configured to be the same as the distance between the cockpit side connection point 52a and the rear upper section side connection point 52b of the rear link 52. Thus, four connection points of the cockpit side connection point 51a, the rear upper side connection point 51b, the cockpit side connection point 52a and the rear upper side connection point 52b constitute a parallelogram. In any of the vehicle form 1C and the humanoid form 1H, and in any intermediate form during transformation, the posture of the seat surface 21Sa of the seat 21S of the front center section 11 can be kept at the same slope angle.

Moreover, the rear upper section 31, the rear right lower section 32R and the rear left lower section 32L are horizontal both in the vehicle form 1C and the humanoid form 1H. According to this, the posture of the seat surface 21Sa of the seat 21S can kept horizontal before and after transformation.

When performing transformation between the vehicle form 1C and the humanoid form 1H, the upper link group 61 and the lower link group 62 are driven symmetrically to each other. According to this, the rear upper section 31 moves in the vertical direction with respect to the rear right lower section 32R and the rear left lower section 32L in contact with the land surface. Therefore, in any intermediate form of transformation, the posture of the rear upper section 31 can be kept in parallel to the rear right lower section 32R and the rear left lower section 32L. Consequently, the posture of the seat surface 21Sa of the seat 21S in the cockpit 21 disposed keeping a slope angle with respect to the rear upper section 31 can be kept at the same slope angle before and after transformation.

In this way, after moving the front center section 11, serving as the head of the humanoid form 1H, above the front window section 21F, the front right side section 12R and the front left side section 12L move only in the horizontal direction when constituting the chest of the humanoid form 1H. Therefore, the posture of the seat surface 21Sa of the seat 21S is unaffected when constituting the head and the chest of the humanoid form 1H. This enables completion of transformation, keeping the seat surface 21Sa at the same slope angle.

While one embodiment of the invention has been described above, the invention is not limited to the above-mentioned embodiment but various modifications are possible within the scope of the technical idea as defined in the claims, the specification, and the drawings.

The invention claimed is:

1. A transformable robot that can take a vehicle form and a humanoid form, the transformable robot comprising:
   a front center section;
   a front right side section and a front left side section;
   a cockpit;
   a right door section and a left door section;
   a rear upper section; and
   a rear right lower section and a rear left lower section,
   wherein in the vehicle form, the front center section is located at a front center, the front right side section and the front left side section are located on sides of the front center section, the cockpit is located behind the front center section, the cockpit in which a seat is arranged, the right door section and the left door section are located on sides of the cockpit, the rear upper section is located upward behind the cockpit, and the rear right lower section and the rear left lower section are located under the rear upper section;
   wherein in the humanoid form, the front center section constitutes a head, the front right side section and the front left side section constitute a chest, the right door section and the left door section constitute respectively right and left arms, the rear upper section constitutes a lower back, and the rear right lower section and the rear left lower section constitute respectively right and left legs and feet;
   wherein a seat surface of the seat of the cockpit is at a same slope angle in any of the vehicle form and the humanoid form;
   wherein the cockpit and the rear upper section are connected to each other by a front link and a rear link disposed in the longitudinal direction;
   wherein a distance from a cockpit side connection point to a rear upper side connection point of the front link is configured to be same as a distance from a cockpit side connection point to a rear upper side connection point of the rear link; and
   wherein a line connecting between the cockpit side connection point and the rear upper side connection point of the front link and a line connecting between the cockpit side connection point and the rear upper side connection point of the rear link are disposed in parallel to each other;
   wherein the rear upper section, the rear right lower section and the rear left lower section are horizontal both in the vehicle form and the humanoid form;
   wherein the rear upper section, the rear right lower section and the rear left lower section are connected by an upper part link group and a lower part link group disposed symmetrically or approximately symmetrically in the vertical direction; and
   wherein when transforming between the vehicle form and the humanoid form, the upper link group and the lower link group are symmetrically driven.

2. The transformable robot according to claim 1, wherein when the vehicle form is transformed into the humanoid form, the front center section moves above a front window section disposed on a front of the cockpit, and the front right side section and the front left side section constitute the chest by moving in a direction approaching each other in a horizontal direction.

* * * * *